(12) United States Patent
Wilson, Sr.

(10) Patent No.: US 11,015,738 B1
(45) Date of Patent: May 25, 2021

(54) CONDUIT STRAP AND METHODS OF STRAPPING A CONDUIT TO A SURFACE

(71) Applicant: Laurin Thomas Wilson, Sr., Georgetown, SC (US)

(72) Inventor: Laurin Thomas Wilson, Sr., Georgetown, SC (US)

( * ) Notice: Subject to any disclaimer, the term of this patent is extended or adjusted under 35 U.S.C. 154(b) by 0 days.

(21) Appl. No.: 16/810,952

(22) Filed: Mar. 6, 2020

(51) Int. Cl.
*F16L 3/04* (2006.01)

(52) U.S. Cl.
CPC ...................................... *F16L 3/04* (2013.01)

(58) Field of Classification Search
CPC ..... F16L 3/04; F16L 3/08; F16L 3/137; F16L 3/223; F16L 3/123; F16L 3/127; F16L 3/12; F16L 55/035; F16L 3/00; F16L 3/02; F16L 33/02; F16L 3/233; H02G 3/32
See application file for complete search history.

(56) References Cited

U.S. PATENT DOCUMENTS

| | | | | | |
|---|---|---|---|---|---|
| 821,833 | A | * | 5/1906 | Shaffner | F16L 3/1233 248/74.3 |
| 1,529,881 | A | * | 3/1925 | Engle | F16L 3/04 248/71 |
| 1,676,485 | A | * | 7/1928 | Finucane | F16L 3/04 248/74.5 |
| 1,736,807 | A | * | 11/1929 | Thomas | F16L 3/04 248/71 |
| 1,781,145 | A | * | 11/1930 | Williams | H02G 7/05 248/74.3 |
| 1,855,471 | A | * | 4/1932 | Buchanan | F16B 15/0015 248/71 |
| 2,102,900 | A | * | 12/1937 | Konkel | F16L 3/04 248/74.5 |
| 2,310,434 | A | * | 2/1943 | Hyman | F16L 3/04 248/71 |
| 2,689,702 | A | * | 9/1954 | Healey, Jr. | F16L 3/04 248/71 |
| 3,185,420 | A | * | 5/1965 | Stewart | F16L 3/04 248/74.5 |
| 4,709,887 | A | * | 12/1987 | Bongiovanni | F16L 3/2235 248/66 |
| 5,431,810 | A | * | 7/1995 | Russo | B01D 17/02 210/104 |
| 6,634,606 | B2 | * | 10/2003 | Heath | A62C 35/68 248/62 |

(Continued)

*Primary Examiner* — Christopher Garft
(74) *Attorney, Agent, or Firm* — L. Lawton Rogers, III

(57) ABSTRACT

A conduit fastener for attaching an axially extending conduit of predetermined diameter to a surface. The fastener has an elongated strap with an attachment foot located on opposite ends of said strap. The strap overlies the conduit and the feet are apertured to receive a fastener used to attach the feet to the surface and thus the conduit to the surface. The two feet are displaced axially along the conduit to increase the area of contact between the strap and the conduit, to reduce the risk of the fasteners splitting the surface, and to enhance the ability to locate the strap fasteners so as to avoid mortar joints where the surface is masonry or formed from other discrete offset units. Two straps may be used together for form an open or closed angle bracket or chevron configuration with two or three feet, or used in an X-shape configuration. The X-shape configuration may be integral with cross-bodies and four feet, and Y-shaped bodies may be formed having three feet.

19 Claims, 4 Drawing Sheets

(56) References Cited

U.S. PATENT DOCUMENTS

| | | | |
|---|---|---|---|
| 7,347,401 B1* | 3/2008 | Gretz | F16L 3/222 248/68.1 |
| 7,399,922 B2* | 7/2008 | Oga | F16L 3/26 174/135 |
| 2009/0072099 A1* | 3/2009 | Trotter | F16L 55/035 248/74.1 |
| 2020/0240551 A1* | 7/2020 | Escure | A01M 29/30 |

* cited by examiner

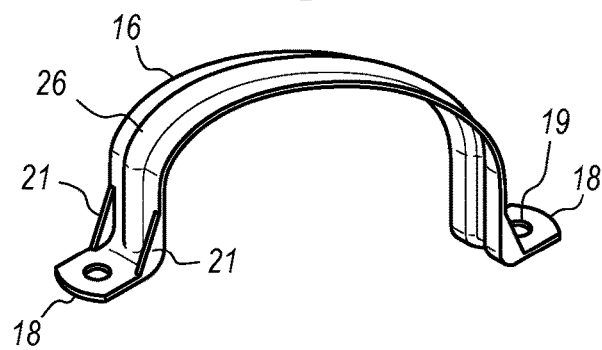
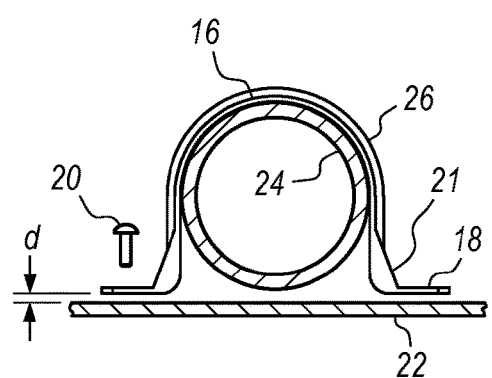
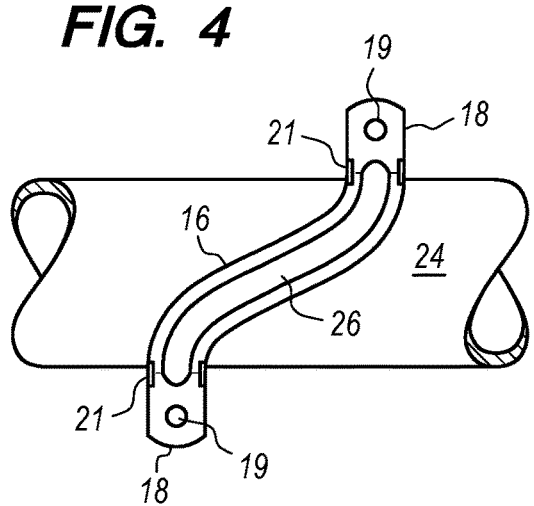
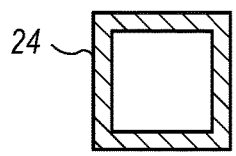
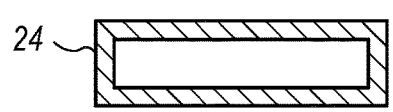
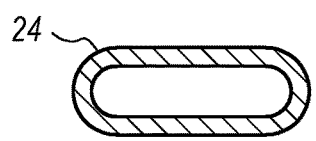

CONDUIT STRAP AND METHODS OF STRAPPING A CONDUIT TO A SURFACE

BACKGROUND OF THE INVENTION

The present invention relates to an improved conduit strap used in securing conduit to a surface such as a floor, wall or ceiling. As used throughout this application, the term "conduit" refers to (a) elongated hollow protective enclosures for electrical, electronic or fiber optic cabling of any size or shape, (b) to such cabling per se, and (c) to elongated hollow pipes or tubes used to convey fluids such as water, fuel or chemicals. The term "strap" as used herein refers to the article of manufacture used to secure such conduit to a surface. Both the conduit and the strap may be made of any material appropriate for the environment in which used, the nature of the cabling protected or fluid conveyed, and the nature and shape of the surface to which the conduit is secured, e.g., metal such as copper, aluminum, galvanized steel or stainless steel and plastics such as the conventional white PVC or grey EPVC reinforced with carbon or other suitable fibers.

Conduit straps are generally of two types. They may be designed for use with a conduit of a predetermined outer diameter (cabling) or predetermined inner diameter (fluids), or "universal" in that they are provided with an adjustment feature permitting their use with conduit having a variety of different outer diameters, even varying shapes. However, the most common straps in commercial use today are of the former type, have some rigidity, and have a generally inverted U-shaped body with an apertured "foot" or surface anchor point on one or both ends through which a fastener is inserted to secure that end of the strap to the surface. Illustrative examples of such straps are illustrated in FIG. 1.

Often referred to as "one-hole straps", some of the straps illustrated in FIG. 1 have only one apertured foot by which the strap is attached to the surface at only one end. Because it is highly desirable that the strap provide pressure on both lateral sides of the conduit, one-hole straps are often more rigid or are alternatively "springy' to permit the strap to "snap" onto the conduit before the strap is fully secured to the surface at one end thereof. Others of the illustrated straps are often referred to as "two-hole straps" and have a body which overlies the conduit and an apertured foot at both ends of the strap for attachment to the surface.

It is often desirable to strap conduit to a surface such as a masonry where there are discrete units (e.g., tiles or bricks) and offset grout or mortar lines. Known two-hole conduit straps have a body that overlies the conduit in a direction substantially normal to the longitudinal axis of the conduit. This often anchors one foot solidly in the discrete unit and the other foot in the less secure grout or mortar, significantly reducing the security of the attachment of the conduit to the surface.

There are other instances where the lateral location of the feet of two-hole conduit straps present a problem. By way of example only, a wooden surface may split from having two fasteners inserted so close together (i.e., essentially the diameter of the conduit apart) depending on the thickness and grain of the wooden surface, defeating the securing of the conduit to the surface and requiring repairs to the surface.

These and other problems with existing conduit straps are addressed by the conduit straps of the present invention where the two feet of the strap are displaced axially along the conduit to increase the area of contact between the strap and the conduit, to reduce the risk of splitting the surface and the location of a strap fastener in a joint where the surface includes laterally offset discrete units.

These and many other advantages will be readily apparent to one skilled in the art to which the invention pertains from a perusal of the claims, the appended drawings, and the following detailed description of the preferred embodiments.

BRIEF DESCRIPTION OF THE DRAWINGS

FIG. 2 is a pictorial illustration of one embodiment of a conduit strap of the present invention illustrating the separation of the strap attachment points along the axis of the conduit on opposite lateral sides thereof.

FIG. 3 is pictorial end view of the embodiment of FIG. 2 installed over a conduit.

FIG. 4 is a pictorial top plan view of the embodiment of FIGS. 2 and 3.

FIG. 5 is a pictorial cross-sectional view of a square conduit.

FIG. 6 is a pictorial cross-sectional view of a rectangular conduit.

FIG. 7 is a pictorial cross-sectional view of an oval conduit.

DETAILED DESCRIPTION OF PREFERRED EMBODIMENTS

Figure 1:
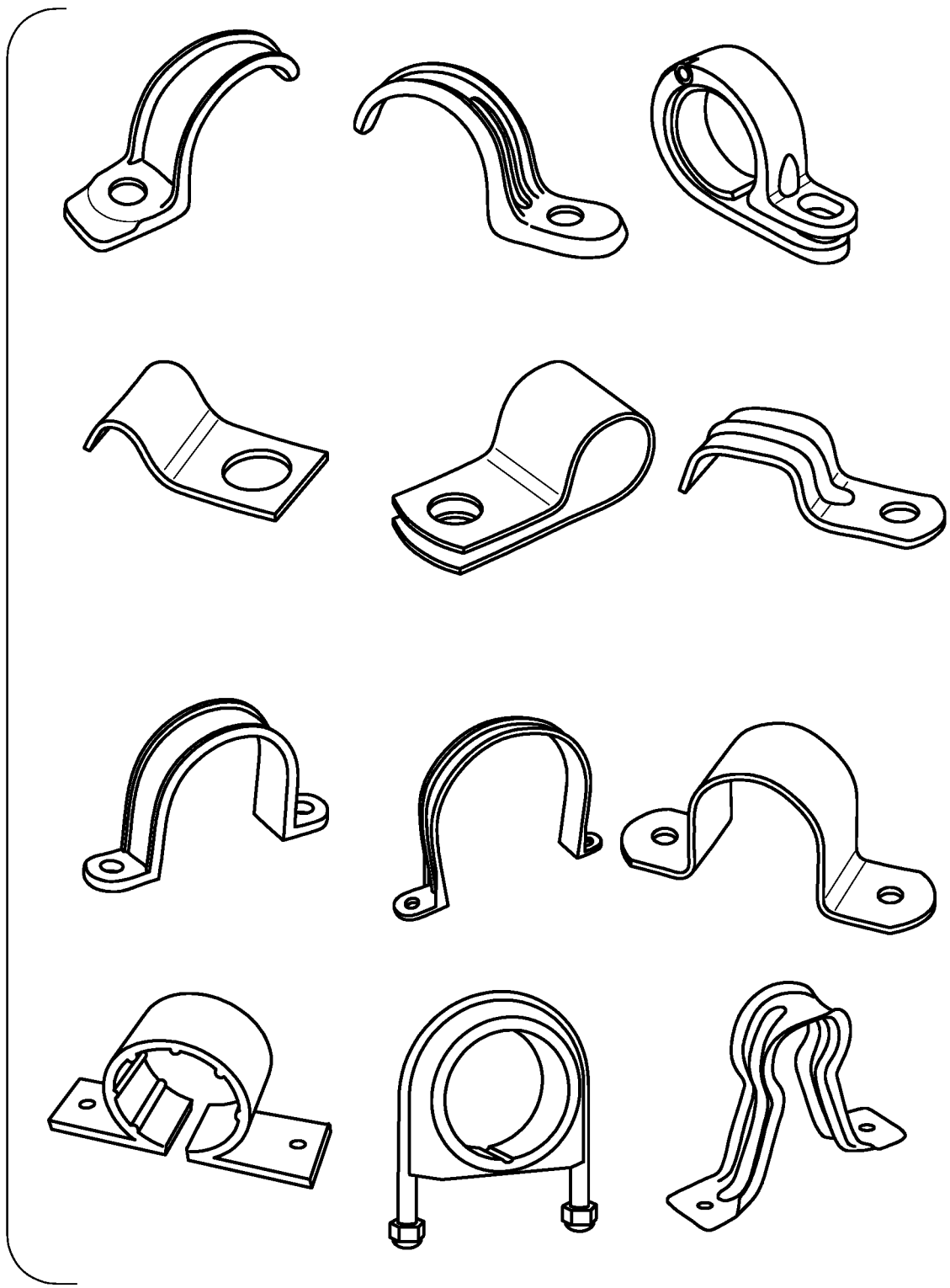
FIG. 1 is a collective pictorial illustration of several common commercial embodiments of one-hole and two-hole conduit straps.

With reference now to the figures where like numerals are used to indicate like elements throughout, one embodiment of the conduit strap of the present invention is illustrated in FIGS. 2-4. With reference to FIGS. 2-4, the conduit strap is formed by an elongated body 16 having a foot 18 on both ends, the feet 18 having an aperture 19 to receive a fastener 20 used to attach the foot 18 to the surface 22. The body 16 is desirably shaped to conform to the outer surface of a fixed diameter conduit 24 and the feet 18 are desirably angled with respect to the ends of the body 16 so as to rest flat upon the surface 22.

As illustrated in FIG. 3, it is also desirable that the length of the body 16 be a little short (e.g., d=⅛ inch) to reach the surface 22 so that the drawing down of the strap around the conduit 24 by attachment of the feet 18 to the surface 22 by the fasteners 20 will cause the body 16 to apply pressure to the conduit 24.

The feet 18 are desirably displaced along the axis of the conduit 24 a distance at least approximately 75% times the outer diameter of the cylindrical conduit 24 and not more than about three times such diameter. The underside of the body 16 desirably conforms to the external surface of the conduit it secures to maximize the contact area between the body 16 and the conduit 24 and to spread the stress created by any force tending to separate the conduit 24 from the surface 22.

The attachment of the foot 18 to the body 16 of the strap may be reinforced as required for the application, e.g., by ridges 21 on both axial sides of the body 16 where it merges with the foot 18 as shown in FIGS. 2-4 10 and 11.

The width and thickness of the body 16 of the strap may be any width and thickness suitable for the conduit with which used. By way of example, a minimum width of ½ inch has been found satisfactory and, for cylindrical conduit between 1½ inch OD and 2⅝ inch OD, the width is desirably increased to about ¾ inch. The body 16 of the strap may have differing cross-sectional configurations as appropriate for the application.

To strengthen the body 16 and to provide stiffness, the embodiment of FIGS. 2-4 has a raised central rib 26 on the side of the body 16 opposite to the conduit 24 over the longitudinal portion of the body in contact with the conduit 24 to increase the strength and stiffness of the strap. In other embodiments, e.g., there may be ribs (e.g., ribs 27 in FIG. 11) along both axial edges of the body 16 and/or cut-outs. Where the body is made of metal, the reinforcing rib 26 may be formed in the metal body 16 without increasing the thickness of the metal body 16, e.g., by stamping a longitudinal grove into the side of the body 16 to be in contact with the conduit 24.

It is to be understood that the conduit 24 may be of any shape in cross-section, e.g., square as shown in FIG. 5, rectangular as shown in FIG. 6 or oval as shown in FIG. 7 and even a flat triangle for cabling laid over a floor. In all instances, it is desirable that the body 16 of the strap will desirably conform to the shape of the conduit being secured to the surface. It is also understood that the conduit 24 may be made of any material suitable for the cabling or fluid carried internally thereof, e.g., metal such as copper, aluminum, galvanized steel or stainless steel. Plastics are generally suitable, e.g., the conventional white PVC for water pipes and the conventional grey EPVC for electrical cabling because of its fire resistant and UV resistant characteristics. Such plastics may be reinforced with carbon or other suitable fibers.

It is also to be understood that the strap of the present invention may be uses with bare cabling, i.e., cabling not encased in conduit, where the cabling has an exterior surface suitable for contact with the material and shape of the body 16 of the strap.

Figure 8:
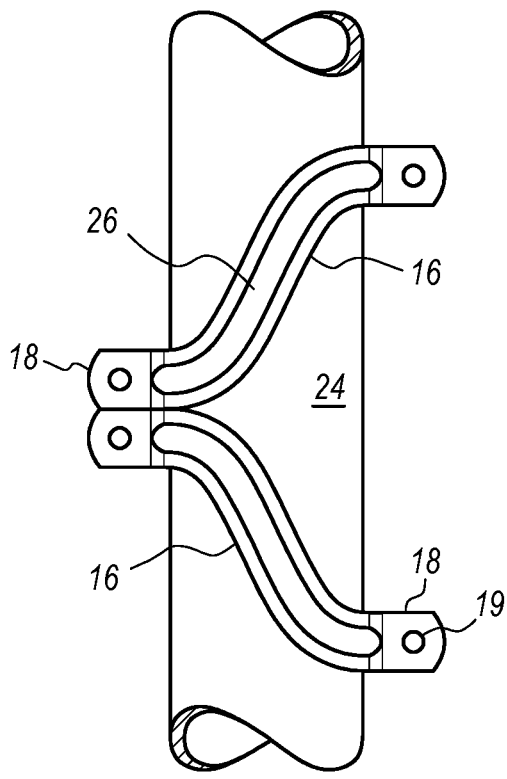
FIG. 8 is a pictorial top plan view of two straps in an open angle bracket configuration installed over a cylindrical conduit.

In an alternative embodiment shown, e.g., in the top of the two straps in FIG. 8, the body 16 the strap may cross the conduit 24 in the opposite direction from that shown in FIG. 4.

Figure 9:
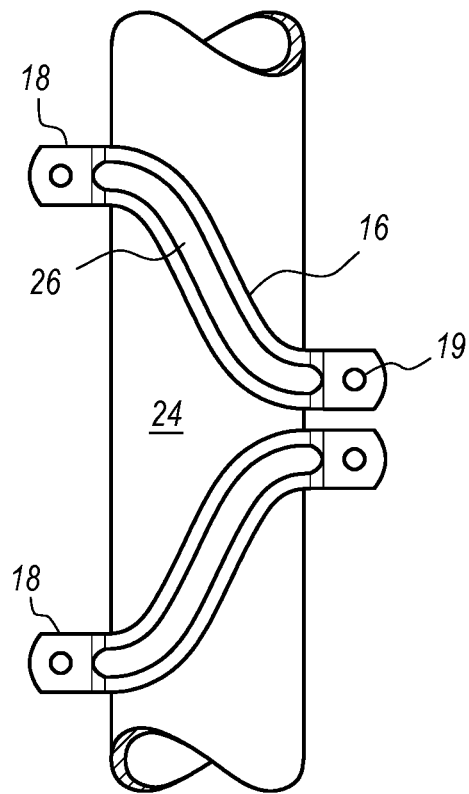
FIG. 9 is a pictorial top plan view of two straps in a closed angle bracket configuration installed over a cylindrical conduit.

When two oppositely crossing straps are used axially adjacent to each other along the conduit, they form an open angle bracket or open chevron (FIG. 8) or a closed angle bracket or closed chevron (FIG. 9).

Figure 10:
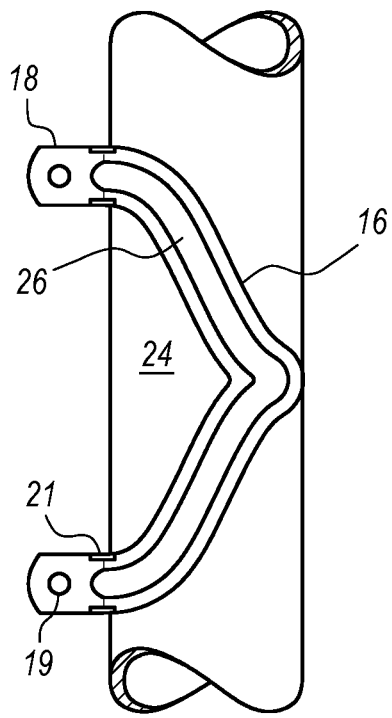
FIG. 10 is a pictorial top plan view of a two-hole strap in a closed angle bracket configuration with two feet on the same lateral side of the conduit.
Figure 10A:
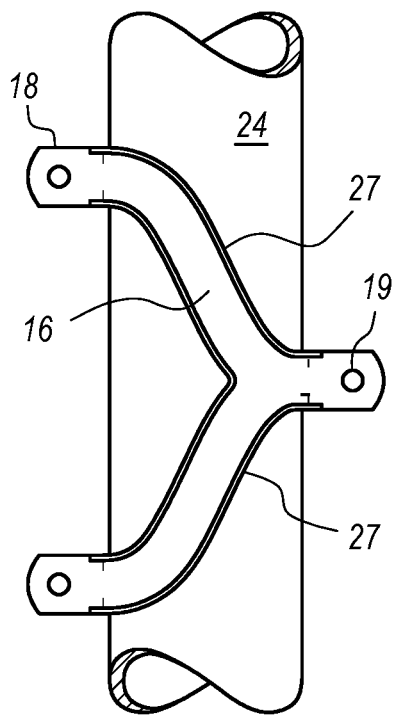
FIG. 10A is a pictorial top plan view of a three-hole strap in the closed angle bracket configuration.

In the embodiment shown in FIG. 10, two of the feet may be eliminated by integrating the two straps that form the closed angle bracket of FIG. 9. This strap is useful where the surface to which the conduit is to be attached does not provide a secure anchoring spot on both sides of the conduit.

Where additional security of attachment is desired, a third foot may be added to the embodiment of FIG. 10 on the other side of the conduit. Many variations in the path of the strap over the conduit will naturally occur, e.g., a generally U-shape body between the feet on the same side of the conduit may be substituted for the generally V-shape of the strap shown in FIG. 10A. As shown in FIG. 10A, the elongated body 16 may be reinforced by ribs 27 extending along both axial edges of the body 16 and may extend as filets 21 into the feet 18.

Figure 11:
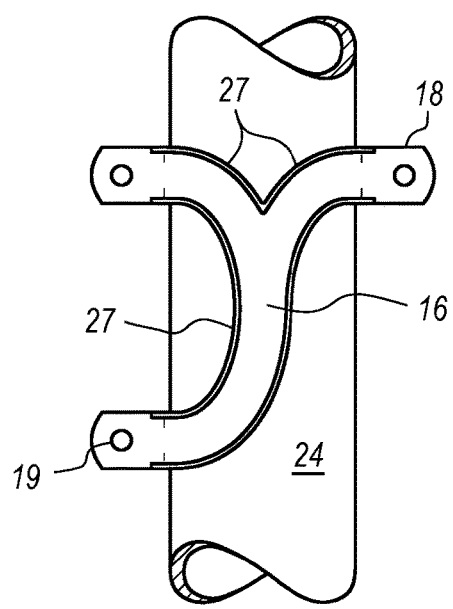
FIG. 11 is a pictorial top plan view of a Y-shape strap overlying a cylindrical conduit illustrating ribs on the lateral edges of the strap.
Figure 12:
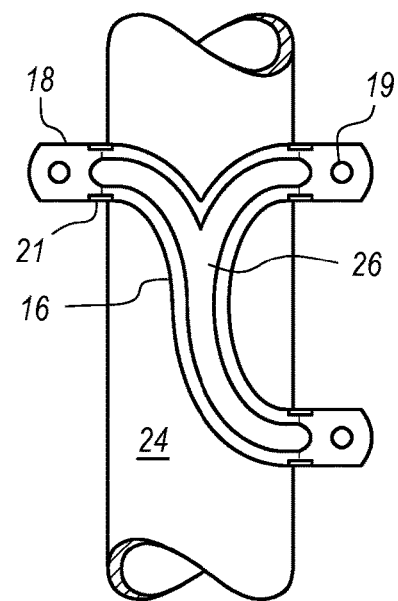
FIG. 12 is a pictorial top plan view of a Y-shape strap overlying a cylindrical conduit illustrating ribs in the center of the strap.
Figure 13:
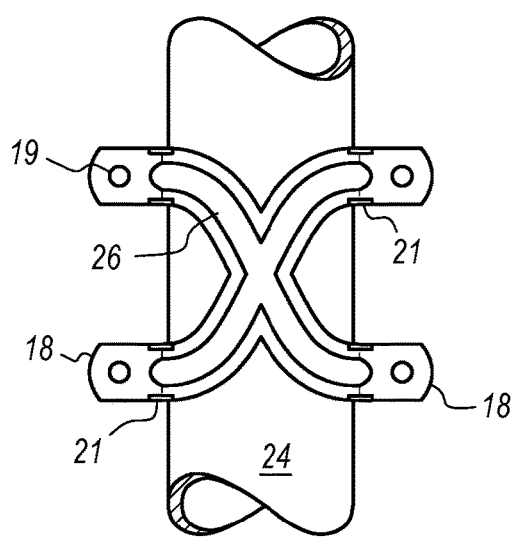
FIG. 13 is a pictorial view of an X-shape strap overlying a cylindrical conduit.
Figure 14:
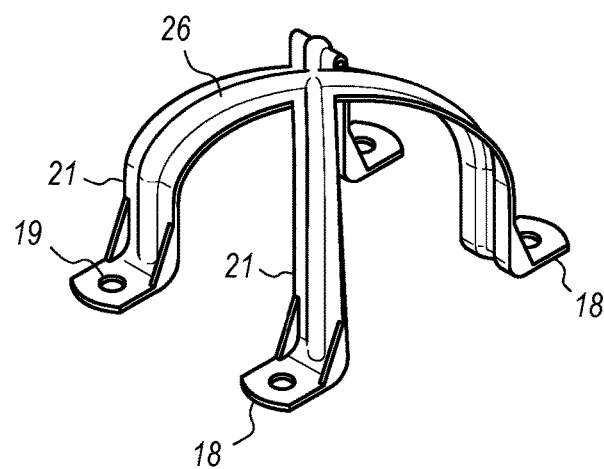
FIG. 14 is a pictorial view of the integral X-shape strap of FIG. 13.

In still other embodiments such as shown in FIGS. 11 and 12, the stability of the embodiment shown in FIGS. 2-4 may be increased by the use of a Y-shape body 16.

Where the axial space available is not sufficient to use two axially spaced straps as shown in FIGS. 8 and 9, the two straps may be integrated into a X-shape configuration, with the body of one strap crossing the body of the other strap. One or both of the bodies may be notched or otherwise modified in thickness to facilitate the crossing with the bodies of both straps in contact with the conduit. However, as shown in FIGS. 13 and 14, the two straps crossing in opposite directions may be integrated into a single conduit strap with four feet 18 and an integral X-shape ribbed body 26.

ADVANTAGES AND SCOPE OF INVENTION

Many advantages will occur to one skilled in this art from the above description of preferred embodiments. Among the advantages associated with the displacement of the feet of a conduit strap along the axis of the conduit is the increased area of contact between the body 16 of the strap and the conduit 24 as compared with known straps which cross the conduit at a right angle to the axis of the conduit.

When, for example, the conduit is to be attached to a surface created by discrete components, e.g. bricks that are generally laid with adjacent rows offset one-half the width of a brick, the conventional two-hole straps often locate one foot in the center of the brick in one row and the other foot in the mortar used between adjacent bricks in the adjoining row, thus significantly diminishing the holding power of the strap. By offsetting the feet of the strap, the fasteners passing through both feet may be located in bricks.

When, for example, the conduit 24 is attached to a wood surface, there is a risk that the location of the two fasteners only a conduit diameter away from each other will split the wood surface, a risk exacerbated where the wood surface has a grain which runs between the two fasteners or nearly so.

When, for example, two straps are used in close proximity along the axis of the conduit into a forward facing or open angle bracket (open chevron) or backward facing or closed angle bracket (closed chevron), significantly greater holding power is achieved. Such configurations have been found particularly useful where the conduit is cantilevered into an open space, crosses an open space or the surface is a ceiling where the straps must bear the weight of the conduit and the cabling therein.

When, for example, two straps form an X-shape with the body of one strap overlying another (whether integrally formed or two separate straps), the holding power is maximized and is significantly more than can be achieved by the use of two two-hole straps proximate to each other. As with the open and closed chevron configurations, the X-shape configuration has been found particularly useful where the conduit is cantilevered into an open space, crosses an open space or the surface is a ceiling where the straps must bear the weight of the conduit and the cabling therein. Having the feet on the same side of the conduit separated provides increased flexibility in securing the strap to the surface, i.e., the feet may flex independently.

There are occasions where there is room to secure fasteners only on one lateral side of the conduit, e.g., the conduit runs along the junction of a floor and a wall or a fastener on the other side of the conduit would be in a line of mortar. In such situations, the embodiment of FIG. 10A may provide a secure attachment.

These and many other advantages will be readily apparent to one of skill in this art from the appended claims and the foregoing drawings and written description.

While preferred embodiments of the present invention have been described, it is to be understood that the embodiments described are illustrative only and many variations and modifications will naturally occur to those of skill in this art from a perusal hereof. Accordingly, the scope of the invention is to be defined solely by the appended claims when accorded a full range of equivalence.

What is claimed is:

1. In a conduit strap for attaching an axially extending cylindrical conduit of predetermined diameter directly against a surface by linear movement of the strap from a position overlying the conduit toward the surface, said strap comprising an elongated body and two feet located one each at the two terminal ends of said elongated body, said strap being adapted to overlie the cylindrical conduit in contact with the outer surface thereof over approximately one half the circumference of the cylindrical conduit and having a length sufficient to place both of said [apertured] feet in proximity to the surface to which the cylindrical conduit is to be attached, said two feet (a) extending in opposite directions outwardly from said body in a direction generally normal to the longitudinal axis of the cylindrical conduit on opposite sides hereof, (b) being adapted to lie substantially flat against the surface to which the conduit is to be attached, and (c) having an aperture therein through which a fastener may be inserted to effect the attachment of said two feet to the surface to thereby attach the cylindrical conduit to the surface in pressural contact therewith, the improvement wherein one of said two feet is spaced axially along the conduit from the other of said two feet a distance as least as great as the predetermined diameter of the cylindrical conduit to form a curved shape between said two feet when viewed from above the conduit, thereby increasing (a) the amount of contact of said body with the outer surface of the conduit and (b) the spacing between the fasteners.

2. A conduit strap for attaching an axially extending conduit having a predetermined cross-section to a surface in direct contact therewith to thereby enhance the stabilization of the conduit, said strap comprising (a) an elongated body configured to overlie the conduit in direct contact therewith and (b) two apertured feet located one each at the two ends of said elongated body and being configured to directly contact the surface for attachment thereto, said two feet extending in opposite directions laterally away from the conduit, the distance between said two feet along the axis of the conduit being at least 75% of the distance between said two feet normal to the axis of the conduit so that said body forms a curved shape between said two feet when viewed from above the conduit to conform to the conduit and thereby increase the area of contact between said body and the conduit.

3. The conduit strap of claim 2 wherein the cross-section of said conduit is generally rectangular.

4. The conduit strap of claim 2 wherein the cross-section of said conduit is substantially circular.

5. The conduit strap of claim 2 wherein said two feet are carried by said elongated body on opposite lateral sides of the conduit.

6. The conduit strap of claim 2 wherein the length of said body is insufficient to put said two feet in contact with the surface when overlying the conduit in the absence of attachment to the surface so that attachment results in direct contact between the conduit and the surface.

7. The conduit strap of claim 6 wherein the spacing between said two feet and the surface when overlying the conduit is about ⅛ inch.

8. The conduit strap of claim 2 wherein said elongated body includes at least one outwardly extending rib extending longitudinally a distance not less than about ½ the cross-sectional periphery of the conduit.

9. The conduit strap of claim 8 wherein said at least one rib comprises a rib centrally located on said elongated body.

10. The conduit strap of claim 8 wherein said at least one rib comprises a rib adjacent to each lateral side of said elongated body.

11. The conduit strap of claim 10 wherein said lateral side ribs extend longitudinally the entire length of said elongated body into contact with both of said two feet.

12. The conduit strap of claim 2 including a reinforcing rib on both lateral sides of said elongated body adjacent to each of said two feet connecting said elongated body thereto.

13. The conduit strap of claim 2 wherein said strap is metallic.

14. The conduit strap of claim 2 wherein said strap is plastic.

15. The conduit strap of claim 14 wherein said strap is EPVC.

16. A conduit strap for attaching an axially extending circular conduit having a predetermined diameter to a surface in direct contact therewith so as to enhance the stability of the conduit, said strap comprising (a) an elongated body configured to overlie the conduit in contact therewith and (b) two apertured feet located one each at the two ends of said elongated body on opposite lateral sides of the conduit, the elongated body forming a curved shape when viewed from above the conduit, said strap being configured to linearly move from an overlying position spaced from the conduit into a position in direct contact with the conduit and in direct contact with the surface to thereby facilitate operable installation without changing the orientation of the strap relative to the orientation of the conduit, said two feet being spaced apart along the axis of the conduit at least 75% of the predetermined diameter of the conduit, said body having an outwardly extending reinforcing rib over the portion of said elongated body in contact with the conduit, the juncture of said body with said two feet being reinforced by laterally extending fillets on both axial sides of each of said two feet.

17. The conduit strap of claim 16 wherein said elongated body, said feet, said rib and said fillets are integral and are made of plastic.

18. The conduit strap of claim 2 wherein said body is Y-shaped and includes a third foot extending outwardly away from the conduit in a direction parallel to one of said two feet so that there one foot on one lateral side of the conduit and two feet on the other lateral side of the conduit, the axial distance between said two feet on said one side of the conduit being at least equal to the lateral distance between said two feet on opposite sides of the conduit.

19. The conduit strap of claim 2 wherein said body X-shaped body and includes a third and a fourth foot extending outwardly away from the conduit in opposite directions parallel respectfully to the direction of said two feet so that there are two of said feet on one lateral side of the conduit and two of said feet on the other lateral side of said conduit, the axial distance between said feet on each of the two lateral sides of the conduit being at least 75% of the lateral distance between said feet on opposite sides of the conduit.

\* \* \* \* \*